United States Patent
Zhou et al.

(10) Patent No.: US 9,237,174 B2
(45) Date of Patent: Jan. 12, 2016

(54) SYSTEM AND METHOD TO KEEP CONTINUITY OF MEDIA FLOWS FOR A COLLABORATIVE SESSION WITHOUT CONSTANT CONTROLLER(S) INVOLVEMENT

(75) Inventors: Xiaofei Zhou, Singapore (SG); Pek Yew Tan, Singapore (SG); Swaroop Sampath Kumar, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 487 days.

(21) Appl. No.: 13/577,732

(22) PCT Filed: Feb. 10, 2010

(86) PCT No.: PCT/JP2010/000839
§ 371 (c)(1),
(2), (4) Date: Oct. 31, 2012

(87) PCT Pub. No.: WO2011/099068
PCT Pub. Date: Aug. 18, 2011

(65) Prior Publication Data
US 2013/0073508 A1    Mar. 21, 2013

(51) Int. Cl.
*G06F 15/16* (2006.01)
*H04L 29/06* (2006.01)

(52) U.S. Cl.
CPC ......... *H04L 65/1083* (2013.01); *H04L 65/1016* (2013.01); *H04L 65/1063* (2013.01)

(58) Field of Classification Search
CPC ......... H04L 65/1016; H04W 28/0263; H04M 15/90; H04Q 3/0029
USPC .......................... 709/217, 220, 223, 227, 230
See application file for complete search history.

(56) References Cited

U.S. PATENT DOCUMENTS

| 7,570,752 B2 | 8/2009 | Jachner |
|---|---|---|
| 2007/0081644 A1 | 4/2007 | Jachner |

(Continued)

FOREIGN PATENT DOCUMENTS

| CN | 1937667 | 3/2007 |
|---|---|---|
| CN | 101232413 | 7/2008 |

(Continued)

OTHER PUBLICATIONS

3GPP TSG SA WG2 Meeting #77 "Control transfer upon loss of Collaborative Session control," TD S2-100276, XP050432853, Jan. 18-22, 2010, pp. 1-4.*

(Continued)

*Primary Examiner* — Joseph E Avellino
*Assistant Examiner* — Marshall McLeod
(74) *Attorney, Agent, or Firm* — Dickinson Wright PLLC

(57) ABSTRACT

A system of managing collaborative session control when controller is lost or changes to passive-control mode in a data communication network comprising of a control-capable terminal device that can generate and send user preferences on successive controller selection and control policy, a master server device that can make control transfer decisions or take over control upon events, a normal terminal device that can process and response to master server queries on control capacity and its willingness to take over control. These apparatus are connected to each other inside one collaborative session, regardless of their subscriptions. A method of control management of the collaborative session without constant enrollment of controller comprises the steps of sending different types of preferences to master server device; making control transfer or handover decision; and interacting with affected terminals.

20 Claims, 9 Drawing Sheets

(56) References Cited

U.S. PATENT DOCUMENTS

2009/0287828 A1 11/2009 Wei
2010/0279670 A1* 11/2010 Ghai et al. ............... 455/414.3

FOREIGN PATENT DOCUMENTS

| CN | 101383826 | 3/2009 |
|---|---|---|
| JP | 2003-67316 | 3/2003 |
| JP | 2005-100030 | 4/2005 |

OTHER PUBLICATIONS

3GPP TR 23.831 V0.1.0, "3rd Generation Partnership Project; Technical Specification Group Services and System Aspects; IP Multimedia Subsystem (IMS) Service Continuity; Inter-UE Transfer enhancements; Stage 2 (Release 10)," XP050432628, Nov. 2009, pp. 1-28.*

English translation of Chinese Search Report which is an annex to the Chinese Office Action dated Aug. 28, 2014.

3GPP TS 23.237 V9.2.0, "3$^{rd}$ Generation Partnership Project; Technical Specification Group Services and Architecture; IP Multimedia Subsystem (IMS) Service Continuity; Stage 2 (Release 9)," Sep. 2009, pp. 1-88.

3GPP TS 24.237 V9.0.0 "3$^{rd}$ Generation Partnership Project; Technical Specification Group Core Network and Terminals; IP Multimedia (IM) Core Network (CN) subsystem IP Multimedia Subsystem (IMS) Service Continuity; Stage 3 (Release 9)," Sep. 2009, pp. 1-119.

3GPP TR 23.838 V9.0.0 "3$^{rd}$ Generation Partnership Project; Technical Specification Group Services and System Aspects; IP Multimedia Subsystem (IMS) service continuity enhancements; Service, policy and interaction; Stage 2 (Release 9)," Jun. 2009, pp. 1-51.

3GPP TSG SA WG2 Meeting #76, "Requirement of Control transfer upon lost of Collaborative Session control," TD S2-096767, Nov. 16-20, 2009, pp. 1.

English translation of Chinese Search Report which is an annex to the Chinese Office Action dated Apr. 13, 2015.

International Search Report dated Oct. 25, 2010.

* cited by examiner

SYSTEM AND METHOD TO KEEP CONTINUITY OF MEDIA FLOWS FOR A COLLABORATIVE SESSION WITHOUT CONSTANT CONTROLLER(S) INVOLVEMENT

TECHNICAL FIELD

The present invention pertains to the field of telecommunication in a packet-switched communications network. More particularly, it concerns session control in an IP Multimedia System.

BACKGROUND ART

As more and more devices gain networking capabilities, the need for a user to manage these multiple devices arises. Such a work item has been undertaken in 3GPP under the scope of collaborative session management. Here, a number of user's devices that registered with IMS services can cooperate with each other in a session with different media flows. A collaborative session is a multimedia session with multiple UEs involved and collaborative with each other. Controller UE manages media on controllers by interacting with an Application Server. Any request from controller must be authorized by controller before taking into action. Usually one media flow is controlled by just one controller.

Due to the single controller configuration (for a specific flow) in a collaborative session, there exists a problem when controller is lost due to uncontrollable reasons like UE breakdown, battery exhausted, UE out of coverage, unstable signal, etc. There are also situations when controller wants to change itself to passive-control mode or leave collaborative session temporarily. These cases may happen when controller doesn't want to be interrupted each time a controller makes a change, or when no controller propose any request for a long time. Here passive-control mode means that the controller UE opts to be in auto-control mode or temporarily gives the control to Application Server. That is, the controller UE stays passive by setting up rules that make decisions on certain trigger scenarios or assigning responsibility to other nodes such as Application Server or Controller UEs.

In latest 3GPP TS23.237, it is indicated that SCC AS releases all Access Legs participated in a Collaborative Session when controller is lost.

The problems of this approach are that the controllers are always forced to terminate the session without knowing what has happened, and they cannot continue or resume even if the user wants to continue and is willing to pay.

Another possible approach is to allow the SCC AS to transfer the Collaborative Session control to another UE involved in the Collaborative Session and belonging to the same subscription", if the controller is lost [Non-patent document 4].

This method makes a step to solve this problem but it doesn't specify how to select the successive controller and what happens if other UEs are under different subscription. Obviously, some better solutions are needed to solve the problem for controller wants to change to passive-control mode, which is inevitable when the operator deployed the collaborative session service.

CITATION LIST

Non Patent Literature

[NPL 1]
3GPP TS 23.237 v9.2.0, "IP Multimedia Subsystem (IMS) Service Continuity"
[NPL 2]
3GPP TS 24.237 v9.0.0, "IP Multimedia Subsystem (IMS) Service Continuity"
[NPL 3]
3GPP TR 23.838 v9.0.0, "IP Multimedia Subsystem (IMS) service continuity enhancements; Service, policy and interaction"
[NPL 4]
3GPP TSG SA WG2 Meeting #76, 16-20 Nov., 2009, San Jose Del Cabo, Mexico TD S2-096767, "Requirement of Control transfer upon lost of Collaborative Session control"

SUMMARY OF INVENTION

It is an objective of the invention to address the above mentioned problems, shortcomings, and incompleteness. In particular it aims to provide a method to support continuity of the collaborative session when controller is not available.

Another objective of the invention is to provide a robust system tolerating to controller loss, containing Application Server and UEs without limitation on releases, subscriptions and capabilities. In the system, a collaborative session is established with single or multiple controller(s). Each controller has its own responsibility to control certain media flows. All terminal UEs cooperate with each other and with the Application Server to avoid session interrupt when controller is lost by accident or controller leaves.

In one aspect, control-preference information is sent to an application server. When controller is lost or changed to passive mode, a new controller could be decided by referring to the reference or decide by default rules. Subsequent action may be transferring the control to another device, which will be asked for willingness to take over the control and charge.

In another aspect, preference contains one or more lists. These lists are used to designate the successor controller if current controller is lost; to provide rules on how to choose its successor; to set limitation on media management; and to set trigger point for session release.

In yet another aspect, the terminal is capable of requesting the Application Server to change control to passive control mode. During passive control, normal decisions like media resolution modification etc are automatically made by Application Server through preference control rules set at the beginning of a session or IMS registration, If query from Application Server is received, the terminal has a function to process and reply the query. Even if it cannot understand the query, the function still replies with an "unknown" message. These additional functions extend the session control to auto-control and emergency cases.

In another aspect, the Application Server contains the preference processing function that can identify different type of preferences and process it for future use. It also has controller loss detection function to detect the controller lost. It further has control transfer decision function refers to preferences when controller is not responsive for some time.

In another aspect, control is extended to both authorization of the session and the charge of media flows. Controller is responsible to make decision on changes of the media flows it controls and it is also the entity that will be charged for those media flows it controls. The preference from controller will indicate how to relocate charging entity in case controller is lost. Control transfer and charge transfer are separate decisions, but controller and Application Server may choose to combine them in the preference and decision.

With these solutions, session has greater chance to continue when controller leaves. Both controller and SCC AS could participate in the decision of control transfer. Subscription is not a limitation any more.

BRIEF DESCRIPTION OF DRAWINGS

FIG. 1 is a diagram illustrating the overall system. It consists of several UE terminals with or without session control capacity, e.g. 101 and 105; an application server (102) that coordinates session terminals; IMS Core Network (103) providing IMS signaling support; and remote party (104) that has session with the UEs.

FIG. 2 is the structure of Terminal Devices that specifically perform as controller (101) in a collaborative session.

FIG. 3 is the structure of Application Server that manages the whole session.

FIG. 4 is the structure of Terminal Devices (105) that perform as other user equipments in the collaborative session, controllers or controllers.

FIG. 5 is a flowchart diagram illustrating how the Application Server makes decision on control transfer when controller lost without notice or controller changes to passive mode.

FIG. 6 is a diagram illustrating the structure of preference that is generated by controller and stored in Application server. In the tree, different types of rules are demonstrated.

FIG. 7 is a diagram illustrating an example operation sequence for controller changing to passive control mode with signals exchanges among UEs and Application Servers.

FIG. 8 is a diagram illustrating an alternative operation sequence for controller lost solution with controller set preferences on when to release the session after controller lost.

FIG. 9 is a diagram illustrating another alternative operation sequence for controller lost solution with controller nominates its successor or set preferences on how to choose the successive controller.

FIG. 10 is a diagram illustrating the a different operation sequence for controller lost solution with Application Server broadcast to UEs among the session about their capacity and willingness to take over control.

FIG. 11 is a diagram illustrating another operation sequence for controller lost solution with Application Server queries on affected UE to take over charge of media terminates at it due to controller loss.

DESCRIPTION OF EMBODIMENTS

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that the embodiments may be utilized, and other changes may be made, without departing from the spirit or scope of the present invention. The following detailed description is, therefore, not to be taken in a limiting sense and the scope of the present invention is defined only by the appended claims. In the following description, for the purpose of explanation, specific numbers, times, structures, protocols, and other parameters are set forth in order to provide a thorough understanding of the present invention. However, it will be apparent to anyone skilled in the art that the present invention may be practiced without these specific details.

Figure 1:
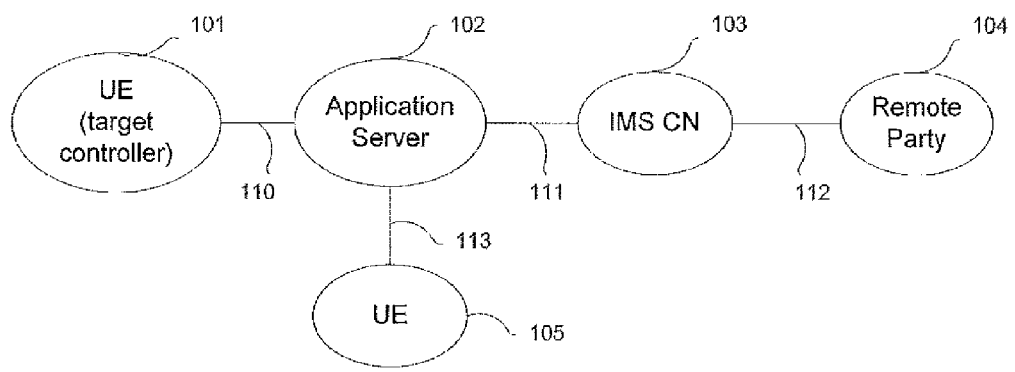
[FIG. 1]

FIG. 1 illustrates a system that supports the present invention, consisting of a Controller UE 101 that controls a collaborative session, a normal UE 105 that participates in the session without the right of control, an Application Server 102 that coordinates the session among UEs and the remote party, the IMS Core Network 103 that provide IMS signaling and routing functions for the session, and the remote party 104 that has the session with the UEs. All UEs, controller or controller, communicate to Application Server through standard IMS procedure. In the invention, communication from Controller to Application Server 110 has additional information beyond standard elements and includes user preference for session control; and the communication from normal UE to Application Server 113 has additional information beyond standard elements and includes UE capacity parameters. Only controller UE 101 is required to send control preference; while other users 105 may choose to send or not send their capacity parameters. The user control preference from 101 may be sent at collaborative/interactive session setup or at IMS registration. The control preference could be in any format that is understandable by the Application Server 102. It is used to instruct the Application Server on how to perform control if the controller leaves with notice, and how to manage the session if controller lost connection without notice. UE capacity parameters could be sent in any format that is understandable by Application Server. It includes for example UE's capacity of control, battery level, IMS release version, etc. This additional information will be used by Application Server for decision making when controller leaves the session or loses the connection. In the present invention, Application Server 102 has additional capability of taking over session control based on control preferences and deciding control transfer to UEs belonging to the session. However, Application Server 102 will never take over charge for the session. Thus it will control the session representing controller in authorization but never representing the controller in charging. Charging is required to be assigned to UE(s). Connection between Application Server and IMS CN 111 and connection between IMS CN and Remote Party 112 make use of standard IMS procedures and carry standard information defined in IMS.

Figure 2:
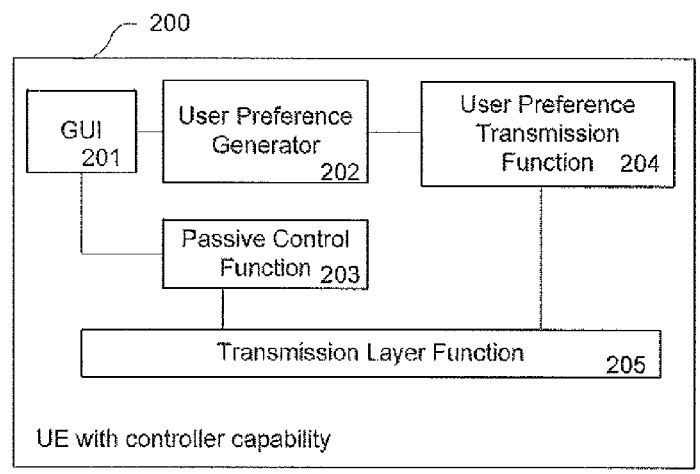
[FIG. 2]

FIG. 2, is a communication device with control capability. It can serve as the controller of a session. Besides traditional functions of user equipment, it also contains GUI block 201 for preference generating interaction; a User Preference Generator 202 connected to GUI; a User Preference Transmission Function 204 that sends the preference through Transmission Layer Functions 205 if it is the controller of the session; a Passive Control Function 203 that can initiate signals requesting to change to passive control mode. The preference contains one or more lists. These lists are used to designate the successor controller if current controller lost connection; to provide rules on how to choose its successor; to set limitation on media management; and to set trigger point for session release. For example, the use may indicate in preference that "Session Termination: 10 min". Then if it leaves, the session will be released after 10 min from his left. Another example may contain media management rules like "Add media: Reject; Modify media: Agree". When controller leaves with this preference, Application Server will reject all add-media requests from controllers and agree all modify-media requests.

Another new function for the terminal is to send request to Application Server for changing itself to passive control mode. During passive control, normal decisions like media resolution modification etc are automatically made by Application Server through preference control rules set at the beginning of a session or IMS registration, or updated using any IMS procedures. To generate user preference, User Preference Generator 202 prepares questions and queries to user through GUI 201. User's answer of the question is stored and processed at User Preference Generator 202, from where a preference file is generated in the format that is understandable by Application Server 102. It is obvious to anyone skilled in the art that this preference file also can be loaded into the terminal via different means, e.g. a storage card, download via internet, transferred via Bluetooth from another terminal, etc.

When a terminal registers as a controller, User Preference Transmission Function 204 is triggered to send the preference out. The preference is targeted at solving the control handover problem in case the controller loses connection. The preference can also contain a set of rules to perform automatic control when controller intentionally changes to passive-control mode. For terminals that are not a controller, User Preference Generator 202 can skip the procedure of generating a user preference during registration. It is obvious to anyone skilled in the art that the preference can be generated later at any time, before the terminal becomes the controller. Additionally, the preference can be updated during the session when changes happened to the session.

Figure 3:
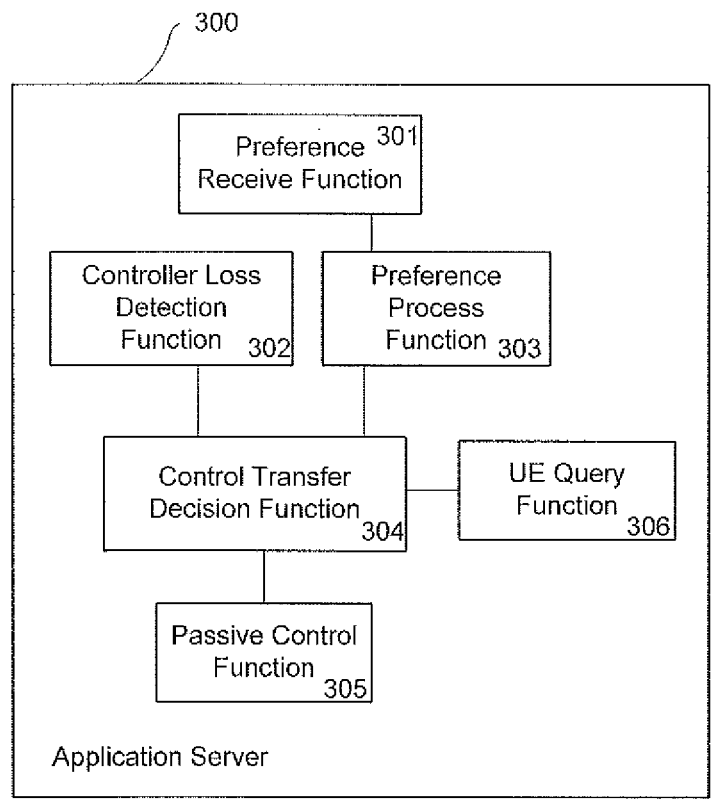
[FIG. 3]

FIG. 3 illustrated an example structure for Application Server 102 that manages the collaborative session. New functionalities are introduced to the Application Server. It contains Preference Receive Function 301 that filters the control preference from other register information; Preference Process Function 303 that analyzes the received control preference; Controller Loss Detection Function 302 that periodically checks the availability of controller; Control Transfer Decision Function 304 that decides the control (and/or charge) transfer in case of controller not involved, based on default rules stored in Application Server or control preferences passed from Preference Process Function 303; Passive Control Function 305 conducts control when controller changes to passive-control mode or session release procedure is activated after controller's lost.

In cases when Application Server does not have capacity parameters of other UEs in the session, it needs to query UE on such information for decision. UE Query Function 306 is to fulfill this purpose. After obtaining enough information, Control Transfer Decision Function 304 decides to perform control transfer or release the session.

If control needs to be taken over by Application Server, it will activate Passive Control Function 305 to conduct control based on user preferences. With these function, Application Server acts as an intelligent agent that can save the session by selecting and transferring control to another UE or even take over control itself when controller is lost or left. Preference Process Function 303 is responsible to explain and classify the control preferences written in any format agreed between terminal and Application Server. For example, the preference may be written with XML and it indicates that the controller successor can only be selected under the same subscription. After processing, this preference is passed to Control Transfer Decision Function 304. When Control Loss Detection Function 302 detects a controller loss, through a timer or other bearer monitors, the Control Transfer Decision Function 304 will only consider those terminals under the same subscription as previous controller to be the successive controller. If no terminal UE is of the same subscription as the lost controller, Application Server should treat it as no preference case. Other operation sequences of the present invention for that case can be utilized to handle it.

Figure 4:
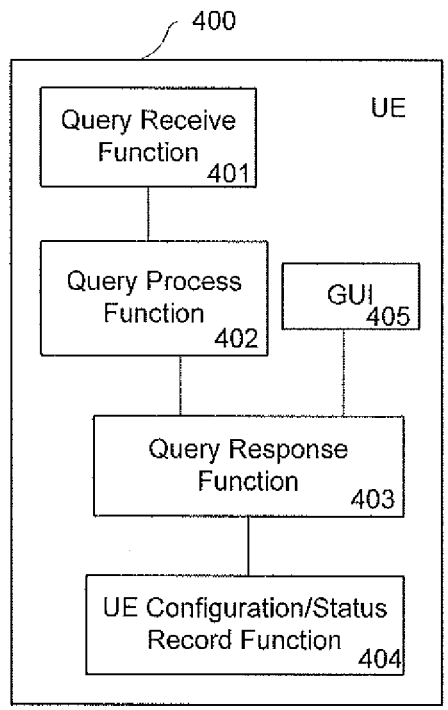
[FIG. 4]

FIG. 4 illustrates an example architecture for a Terminal Device 400 that is a normal communication device with or without control capability. It acts as controller or controller in the collaborative session, but it is not the target controller which will lose connection or changes to passive control mode. Besides traditional functions of normal user equipment, it also contains additional function block that can process and response the query from Application Server 102. In this invention, Application Server may query terminals for their control capability and willingness to take over the control and charge. Query Receive Function 401 and Query Process Function 402 are used to receive such messages and process them. The processed query will be passed to Query Response Function 403 to generate response back to the Application Server 102.

UE Configuration/Status Record Function 404 serves like a database. It provides the parameters and status of the UE and assists Query Response Function 403 to generate the response to Application Server.

If the query cannot be understood by the Query Process Function 402, Query Response Function 403 would generate a response to Application Server 102 indicating that it received an unknown query.

All signaling messages exchanged among 200, 300, 400 can be transported over normal IMS mechanism, e.g. via TCP channel or UDP channel with retransmission mechanism. User preferences are sent together with SIP signal during IMS registration or in a separate packet during collaborative session establishment, or when a UE becomes a controller UE. User decides how many preferences to generate through GUI on Terminal Device 200. All generated preferences will be sent to Application Server 300 from a controller UE.

Figure 5:
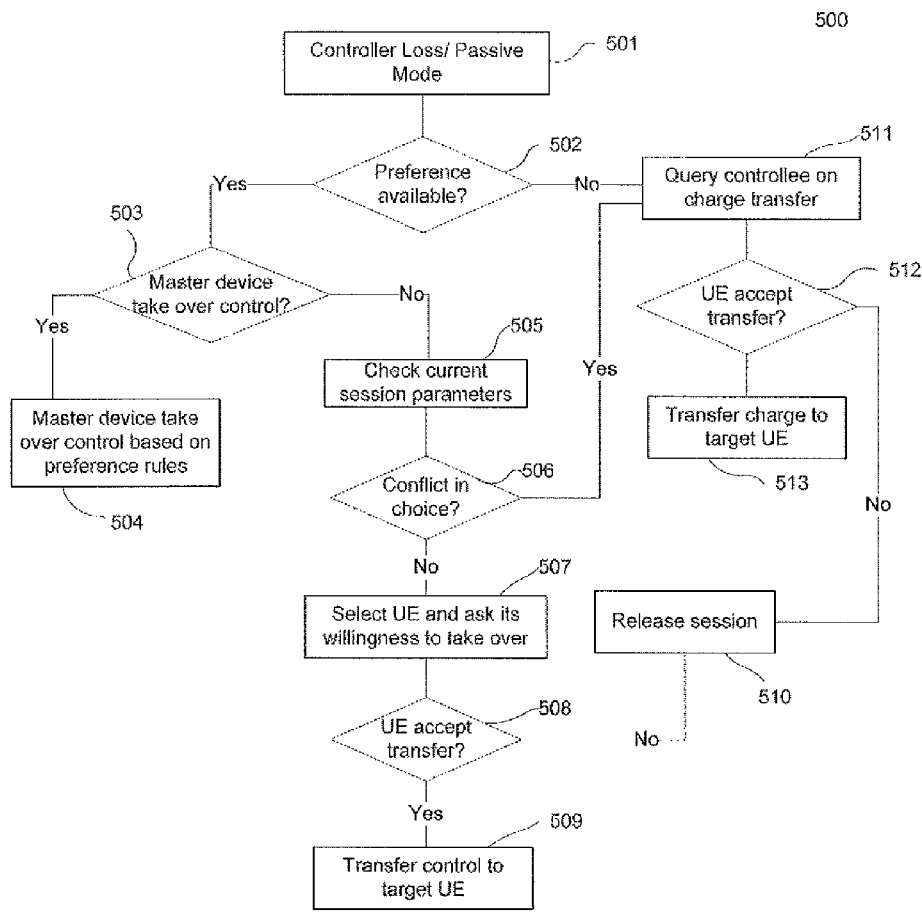
[FIG. 5]

FIG. 5 is the flowchart of example logic for the Application Server 102, which is a major management and decision making device. Solutions for controller loss or passive control problems are summarized in this flowchart.

The diagram consists of major two branches. One is the situation that Application Server needs to take over the control. The other is Application Server does not need to take over the control. The second case is further divided into two braches. One is that controller preference is available and feasible to make decision. The other is preference is not available or exist preference cannot be applied due to confliction with current situation.

When Application Server 102 detected a controller loss or receives a signal indicating a controller changes to passive-control mode, it perform step 502 to check whether a corresponding user preference is available. In case where preference is available, it continues to step 503 and checks whether it needs to take over the control.

There are two situations where Application Server 102 needs to take over control. One situation is controller changes to passive-control mode and requests Application Server to answer control related questions instead of processing it on controller. The other situation is that controller lost connection without notice, and according to pre-set preference, the Application Server 102 is responsible to handle the session, e.g. release it after some trigger, select a different controller and transfer the control over, etc.

In case that Application Server does not need to take over control, it will further go to step 505 to check current session status parameters. Step 506 is a checking procedure that matches user preference with current session status. Current session status includes all information related to the current session. For example, the ID of UE involved in the session, the subscription of each UE, the number of media terminate at each UE, etc. Matching preference with session status is to compare the string or value from two parts. For example, if preference indicates Tom is the successor, Tom will be translated to Tom's UE's ID by function 303 and step 506 will compare this ID with all participated UE IDs in the session. If preference indicates the UE that has maximum number of media flows taking over the control, step 506 will check if there is a UE that possesses maximum number of media flows. If UE satisfying the preference criteria exists in the session, it is said that current session status matches the user preference.

If current session status mismatches with user preference, the decision making procedure will be directed to step 511, which is a branch where no preference is available. An example of mismatch is as following: User preference indicates John will be the successor of current controller. However, when controller is lost, John already left the session. This example can be avoided if Application Server can send a trigger to Controller UE to update its control preference whenever something changes in the session. However, without such kind of triggers, mismatch may happen.

If no mismatch happens between current session status and user preference, in step 507 a successor is decided and selected successor is asked in step 508 whether it accepts to be a new controller. If the selected terminal (successor) is capable of control and agreed to take over, the control is transferred to it; while if it rejected the offer or not capable of performing the control, other operations will be taken in step 510, e.g. release the session. The selection-query-response procedure may be repeated before session release if multiple terminals satisfy the user preference criteria.

When controller is lost without preference, Application Server 102 can neither decide to transfer control nor take over control. It can only try to save the affected session at step 512 by checking whether affected users are willing to take over the charge of his media flow(s). If yes, charge will be transferred to affected user in step 513; while if no, both control and media will be released in step 510. Note that if affected user is the last UE in the collaborative session, there will be no collaborative session anymore after charge transfer, The affected user changes to a normal IMS session, continuing his media flow with remote party 104.

Figure 6:
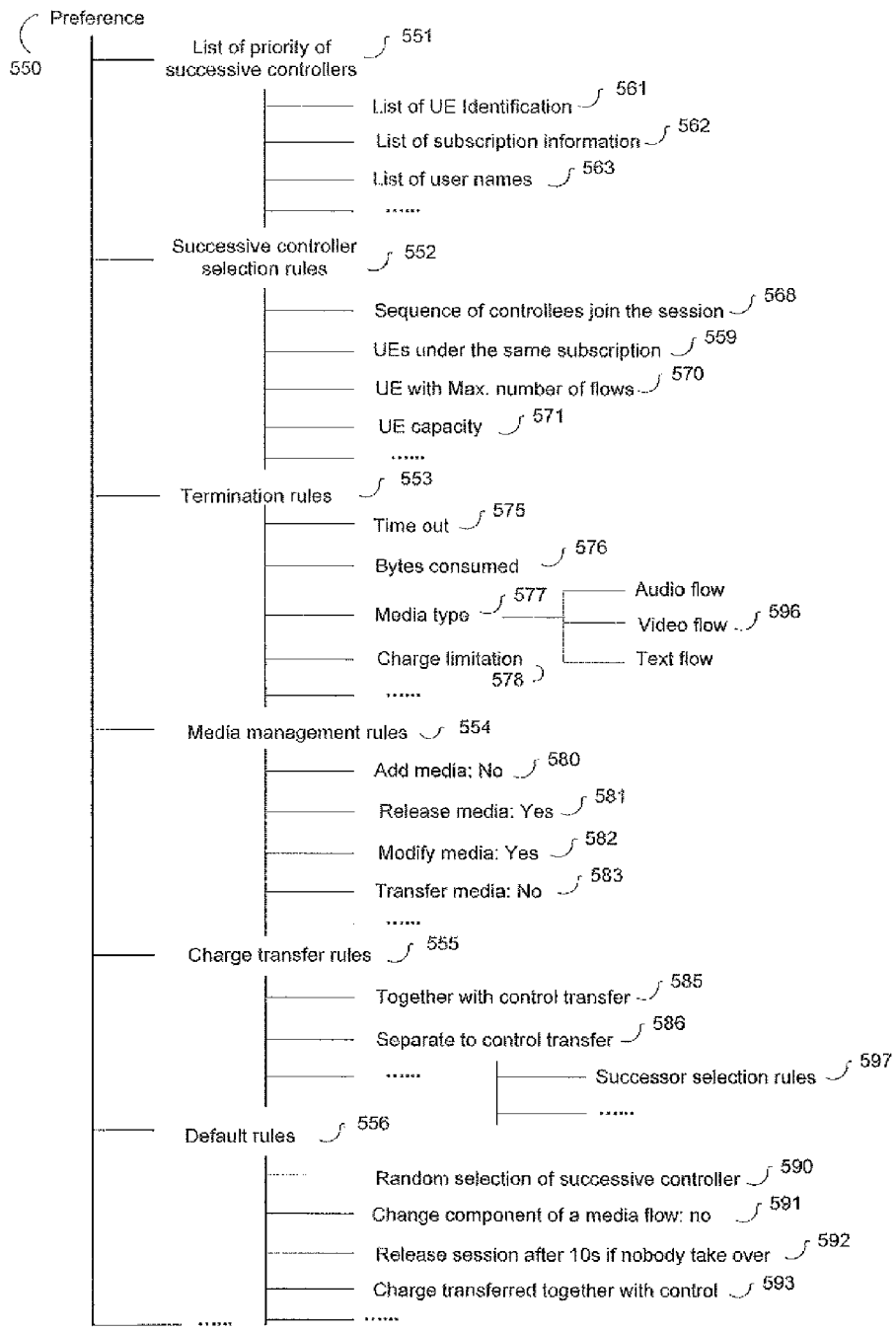
[FIG. 6]

FIG. 6 illustrates the structure of preferences. Six sets of rules are presented based on solutions in this patent. List of priority of successive controllers 551 is a set of rules that designate successive controllers using exclusive identities like subscription information 562, user name 563, UE Identification Number 561, etc. It also specifies the priority of these potential successors so that Application Server knows who to choose first when controller is lost. For example, the preference indicates the successor sequence is Tom-Marry-John. Then Application Server will ask Tom first to take over control in case of controller loss. If Tom rejects the request, Marry will be asked. Such a preference will be updated whenever UEs join or leave the session.

If controller does not want to explicitly designate its successors, Successive Controller Selection Rules 552 may be used to set criteria for Application Server to select the successor. For example, successors are selected according to the sequence of controllers join the session 568. The Application Server will record the join sequence of controllers and select based on it. Another criterion is UE capacity 571, UE capacity includes UE's ability to control, UE's battery level, UE's signal stability, etc. Rule 559 set the criteria of choosing successive controller to be the same subscription. In this case, Application Server may refer to default rule 590 to choose successive controller within those UEs under the same subscription as lost controller.

Termination Rules 553 is a rule set that determines trigger events to terminate a session after loss of controller. It may set a time out 575 for the current session; it may limit the Bytes consumed by controllers 576; it may terminate only certain type of media 577 (e.g. video flows 596); it may set maximum amount of money chargeable 578 after the controller is lost.

Media Management Rules 554 are specially used for passive control mode. Application Server could make control decision based on these rules representing the controller. Charge Transfer Rules 555 decide whether transfer charge together with control or separate from it. If separating from control transfer, the preference will give explicit rules 597 to specify who to transfer the charge. These rules may be similar to rules of successive controller selection but they need to be executed separately from control transfer when controller is lost.

Default Rules 556 are stored at Application Server and serve as backup rules when controller preference does not give a specific candidate for control/charge transfer or when controller preference does not give a specific answer for a controller request. For example, a controller preference only specifies that successive controller should be selected within UEs under the same subscription 559. Then Application Server will use default rule 590 to choose a unique candidate. Another example is that controller request to change one component of a media flow but controller did not give rules for this request in Media Management Rules 554 before changing to passive control mode. In this case Application Server will use default rule 591 to reject the request representing the controller.

Figure 7:
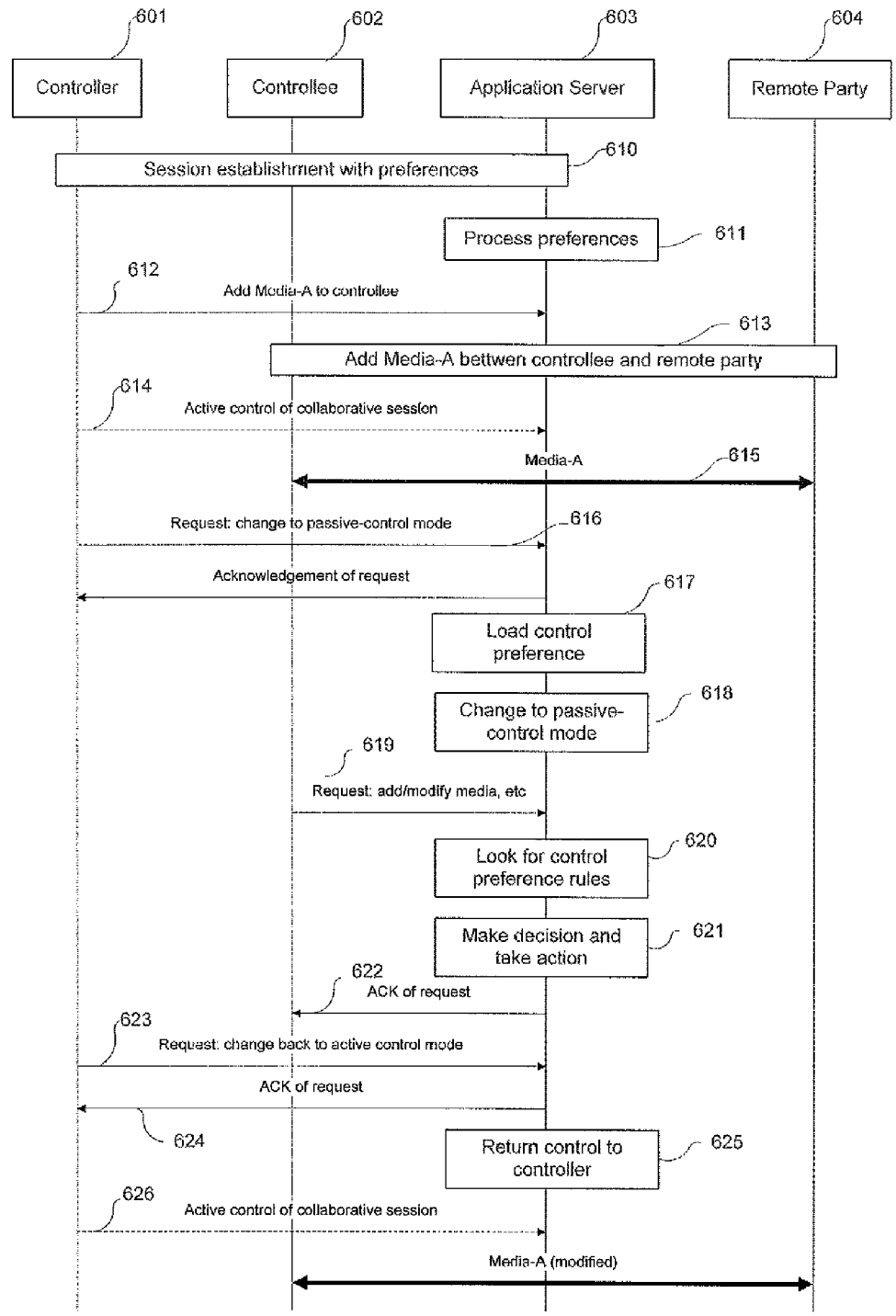
[FIG. 7]

FIG. 7 illustrates an example operation sequence of the presented solution. It illustrates the solution when controller changes to passive control mode. This solution contains Controller 601, Controller 602, Application Server 603, and Remote Party 604.

In step 610, a collaborative session is established with preferences. Application Server 603 processes the preference as in step 611. When Controller 601 requests to add media to Controller at step 612, Application Server accepts the request and performs the media adding at step 613. After these steps, a collaborative session is activated with control from Controller (614) and media flow between Controller and Remote Party (615).

Then Controller requests to change to passive control mode at step 616. Application Server returns an acknowledgement and loads user preference on step 617. After successful loading the preference, the collaborative session changes to passive control mode (step 621). Under passive control mode, if any request comes from the Controller (619), Application Server 603 will look up for control rules in preference (620), make decision and perform the decision (621). After a while, Controller 601 can request to change back to active control mode (623). At the point of receiving this message, Application Server needs to deactivate its Passive Control Function 605 and return to normal mode (625).

Figure 8:
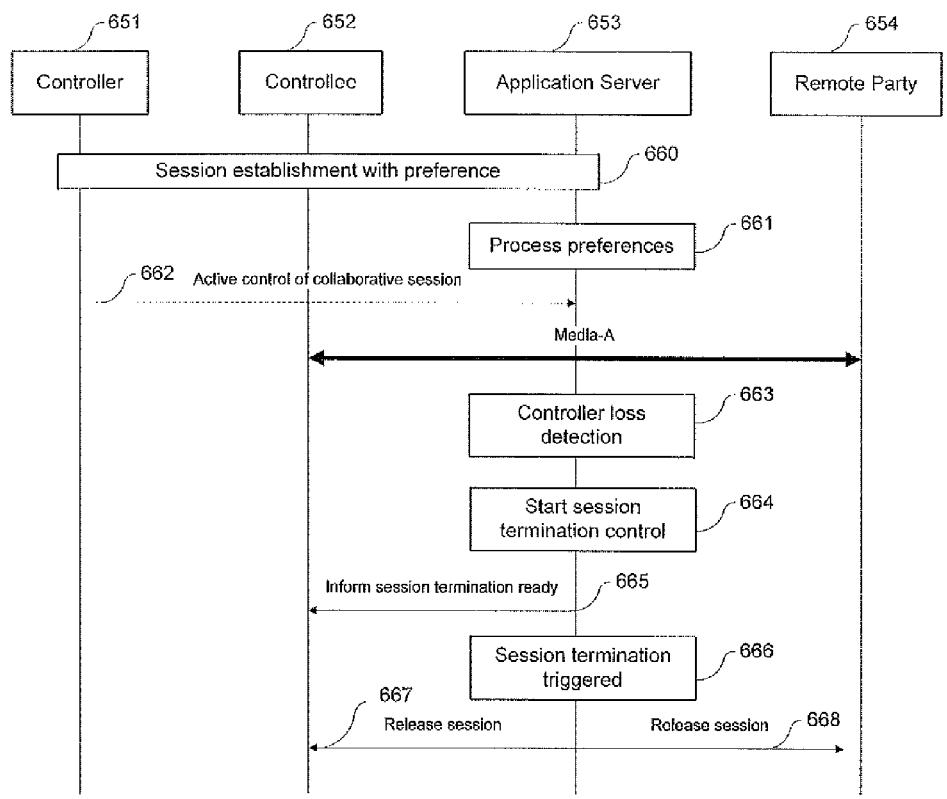
[FIG. 8]

FIG. 8 illustrates another operation sequence of the present solution. It illustrates the solution where controller set criteria on terminating the session upon his lost. This solution contains Controller 651, Controller 652, Application Server 653, and Remote Party 654.

At the beginning of the session, preference is sent and processed at Application Server in steps 660 to 661. This preference does not contain rules to select a successive controller, but it contains the criteria about when to terminate the session if controller is lost. For example, it specifies a timer that should start from the detection of it lost. When the timer expires, the whole session is torn down.

In step 663, the Application Server (653) detects controller loss, and it will automatically start session termination control by Passive Control Function 305. The Application Server may send a signal to affected controller(s) to inform them their session will be terminated after some time, as in step 665. This signal will help controller to complete the most important conversation before their session is forcefully released. When termination event happened as preference indicated (666), the whole session is terminated in step 667 and 668.

Figure 9:
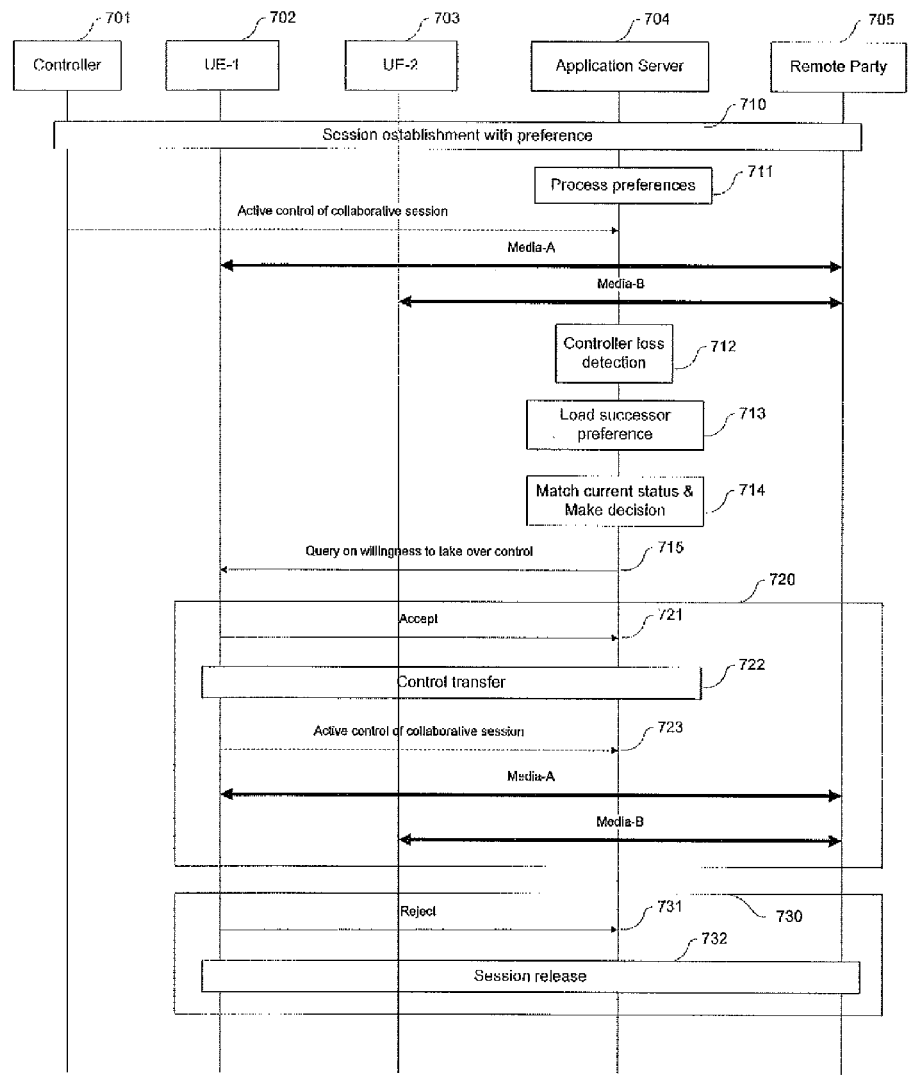
[FIG. 9]

FIG. 9 illustrates another operation sequence of the present invention where the controller nominates its successor or set criteria on how to select it successor if it lost connection. This solution contains Controller 701, UE-1 702 and UE-2 703, Application Server 704, and Remote Party 705. UE-1 and UE-2 may be other controller(s) in the session, or they may be controller(s).

In this solution, Application Server obtains preference after steps 710 and 711. When the Application Server (704) detects a controller loss as in step 712, it loads preference as in step 713 and matches the designated successor or successor selection criteria with current status in step 714.

The selected UE will be queried on his willingness to take over the control as in step 715. If selected UE accepts the request, control is transferred to this UE as in step 720. If selected UE rejects the request, actions will be taken. For example in step 730, the whole session will be released.

Figure 10:
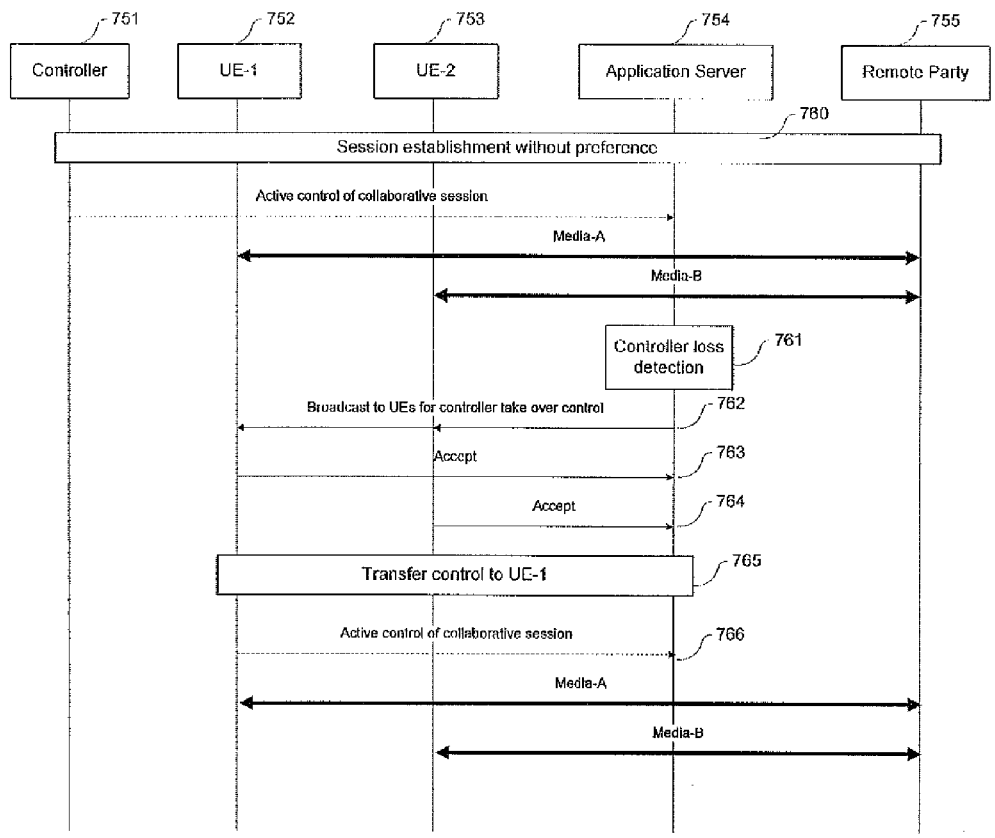
[FIG. 10]

FIG. 10 illustrates yet another operation sequence of the present solution where no preference is set during IMS registration Or collaborative session establishment. This solution contains Controller 751, UE-1 752 and UE-2 753, Application Server 754, and Remote Party 755. UE-1 and UE-2 may be other controller(s) in the session, or they may be controller(s).

In this solution, when the Application Server (754) detects a controller loss, no preference is provided in step 760. To save the on-going media flows, the Application Server broadcast requests to UEs with control capacity at step 762 querying their willingness to take over the control. The first UE accepted the request (as in step 763) will be selected as new controller. If nobody wants to take over the control, the session will be released after certain time.

Figure 11:
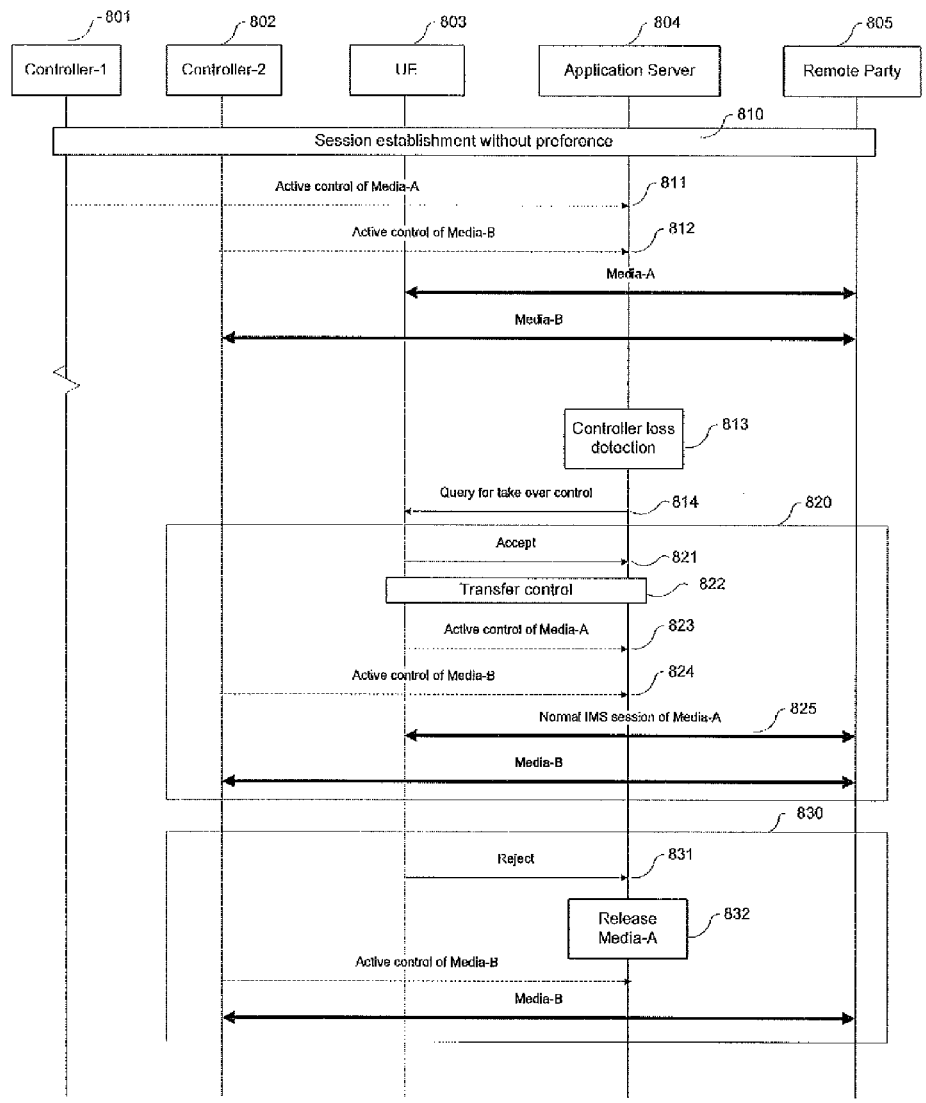
[FIG. 11]

FIG. 11 illustrate another operation of the solution when there is no preference set by controller before the session. It focuses on the terminal that affected by the loss of a controller. This solution contains Controller-1 801, Controller-2 802, UE 803, Application Server 804, and Remote Party 805. Controller-1 controls Media-A and it is the controller that going to be lost, while controller-2 is another controller in the session controls different media (Media-B). UE 803 is a controller that has Media-A with Remote Party 805.

When Application Server (804) detects Controller-1 801 is lost, it sends query 814 to affected UE 803 for charge transfer since Media-A terminates at UE 803. If UE 803 accepts the transfer, steps in 820 are conducted and he will continue the media with Remote Party 805. If UE 803 rejects the charge transfer, media flow may be cut as steps in 830. The Media-B controlled by Controller-2 802 will not be influenced.

The invention claimed is:

1. A method for a system including an application server and UEs comprising:
   transmitting, from a controller UE which controls a collaborative session among the application server and the UEs including the controller UE, preference rules to be used in a special case where at least one of the controller UE is lost from the collaborative session and a mode of the controller UE is changed to a passive control mode;
   selecting, in the special case, a single candidate of successor apparatus from among candidates of successor apparatus based on the preference rules;
   requesting, the single candidate of the successor apparatus to take over a control of the collaborative session; and
   requesting, when the single candidate of the successor apparatus rejects to take over the control of the collaborative session, another single candidate of the successor apparatus, selected from among the candidates of the successor apparatus based on the preference rules, to take over the control of the collaborative session,
   wherein:
   the preference rules contain, at least, information indicating candidates of the successor apparatus.

2. The method of claim 1, wherein, the candidates of the successor apparatus include the UEs involved in the collaborative session.

3. The method of claim 2, wherein, the candidates of the successor apparatus further include the application server.

4. The method of claim 1, wherein, when all candidates of the successor apparatus reject to take over the control, the collaborative session is released.

5. The method of claim 1, wherein, default rules are used for determining whether or not to take over the control to the successor apparatus, when one of (a) at least one of the controller UE is lost from the collaborative session and the mode of the controller UE is changed to a passive control mode, without transmitting the preference rules, and (b) the transmitted preference rules are one of not applicable and not sufficient.

6. The method of claim 5, wherein, the default rules are stored at the application server and are not changeable by any UE involved in the collaborative session.

7. The method of claim 1, wherein, the preference rules are transmitted to the application server.

8. The method of claim 2, wherein, the preference rules are transmitted at one of a registration of IMS service and at a registration of inter-UE transfer service.

9. The method of claim 1, wherein, the controller UE is determined to be lost from the collaborative session when at least one of the connection with the controller UE is lost and the controller UE has not been controlling the collaborative session for a predetermined time period.

10. The method of claim 1, wherein the preference rules further contain at least part of the following information: a set of rules to select the successor apparatus, a set of rules to make default control decisions, and a set of events that will trigger releasing the collaborative session release after the controller UE has been lost.

11. An application server comprising:
   a receiver that receives, from a controller UE which controls a collaborative session among the application server and UEs including the controller UE, preference rules to be used in a special case where at least one of the controller UE is lost from the collaborative session and a mode of the controller UE is changed to a passive control mode;

a selector that selects, in the special case, a single candidates of a successor apparatus from among candidates of the successor apparatus based on the preference rules; and a requester that:
    requests the single candidate of the successor apparatus to take over a control of the collaborative session, and
    requests, when the single candidate of the successor apparatus rejects to take over the control of the collaborative session, another single candidate of the successor apparatus, selected from among the candidates of the successor apparatus based on the preference rules, to take over the control of the collaborative session, wherein:

the preference rules contain, at least, information indicating candidates of the successor apparatus.

12. The application server of claim 11, wherein, the candidates of the successor apparatus include the UEs involved in the collaborative session.

13. The application server of claim 12, wherein, the candidates of the successor apparatus further include the application server.

14. The application server of claim 11, wherein, when all candidates of the successor apparatus reject to take over the control, the collaborative session is released.

15. The application server of claim 11, wherein,
the determining section is configured to use default rules to determine whether or not to take over the control to the successor apparatus, when one of (a) at least one of the controller UE is lost from the collaborative session and the mode of the controller UE is changed to a passive control mode, without transmitting the preference rules, and (b) the transmitted preference rules are not applicable or not sufficient.

16. The application sever of claim 11, wherein, the default rules are stored at the application server and are not changeable by any UE involved in the collaborative session.

17. The application server of claim 11, wherein, the receiving section is configured to receive the preference rules at one of a registration of IMS service and a registration of inter-UE transfer service.

18. The application server of claim 11, wherein, the determining section is further configured to determine that the controller UE is lost from the collaborative session when at least one of the connection with the controller UE is lost and the controller UE has not been controlling the collaborative session for a predetermined time period.

19. The application server of claim 11, wherein the preference rules further contain all or part of the following information: a set of rules to select the successor apparatus, a set of rules to make default control decisions, and a set of events that will trigger releasing the collaborative session release after the controller UE has been lost.

20. A system performing a collaborative session comprising:
    a controller UE that controls the collaborative session among an application server and UEs including the controller UE, and transmits preference rules to be used in a special case where at least one of the controller UE is lost from the collaborative session and a mode of the controller UE is changed to a passive control mode, and
    the application server that:
        selects, in the special case, a single candidate of the successor apparatus from among candidates of the successor apparatus, based on the preference rules,
        requests the single candidate of the successor apparatus to take over a control of the collaborative session, and
        requests, when the single candidate of the successor apparatus rejects to take over the control of the collaborative session, another single candidate of the successor apparatus, selected from among the candidates of the successor apparatus based on the preference rules, to take over the control of the collaborative session, wherein:
    the preference rules contain, at least, information indicating candidates of the successor apparatus.

* * * * *